US012775236B2

(12) United States Patent
Okuyama

(10) Patent No.: US 12,775,236 B2
(45) Date of Patent: Oct. 27, 2026

(54) IMAGE FORMING APPARATUS HAVING CARRIER COLLECTION DEVICE

(71) Applicant: CANON KABUSHIKI KAISHA, Tokyo (JP)

(72) Inventor: Yuta Okuyama, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/798,192

(22) Filed: Aug. 8, 2024

(65) Prior Publication Data

US 2025/0053131 A1 Feb. 13, 2025

(30) Foreign Application Priority Data

Aug. 9, 2023 (JP) ................................ 2023-130215

(51) Int. Cl.
*G03G 21/00* (2006.01)
*G03G 15/00* (2006.01)

(52) U.S. Cl.
CPC ......... *G03G 21/0047* (2013.01); *G03G 15/80* (2013.01); *G03G 21/0058* (2013.01)

(58) Field of Classification Search
USPC .......................................................... 399/356
See application file for complete search history.

(56) References Cited

U.S. PATENT DOCUMENTS

2009/0103957 A1* 4/2009 Hirayama .......... G03G 15/0808 399/285
2020/0292967 A1 9/2020 Kobayashi

FOREIGN PATENT DOCUMENTS

JP 2010230941 A 10/2010
JP 2020079815 A 5/2020
JP 2020101596 A 7/2020
JP 2020148920 A 9/2020

OTHER PUBLICATIONS

Translation of JP2010-230941A, Oct. 2010; cited by applicant, (Year: 2010).*

* cited by examiner

*Primary Examiner* — Quana Grainger
(74) *Attorney, Agent, or Firm* — Canon U.S.A., Inc. IP Division

(57) ABSTRACT

An image forming apparatus includes a carrier collection device including a rotatable collection roller disposed facing an image carrying member, a magnet non-rotatably disposed inside the sleeve, and a conductor member disposed facing the collection roller. The collection device being configured to collect carrier on the image carrying member. The apparatus includes a first bias application unit configured to apply a first bias obtained by superimposing a direct-current voltage and an alternating-current voltage, to the collection roller, and a second bias application unit configured to apply a second bias including a direct-current voltage, to the conductor member. During image forming operation, an alternating-current electric field is formed between the collection roller to which the first bias is applied and the conductor member to which the second bias is applied.

18 Claims, 11 Drawing Sheets

IMAGE FORMING APPARATUS HAVING CARRIER COLLECTION DEVICE

BACKGROUND OF THE DISCLOSURE

Field of the Disclosure

The present disclosure relates to an image forming apparatus, such as a multifunctional peripheral having a plurality of functions of a copier, a printer, and a facsimile.

Description of the Related Art

As an image forming apparatus, there has been a well-known configuration for forming a toner image by using a two-component developer including a non-magnetic toner and a magnetic carrier. In the configuration, an electrostatic latent image on a photosensitive drum is normally developed using the toner as the toner image in a development step, and particles as the carrier also adhere to the photosensitive drum at a certain percentage in some cases (carrier adhesion). The occurrence of carrier adhesion affects the output image. United States Patent Application Publication No. 2020/0292967, for example, discusses a configuration including a carrier collection device that collects carrier particles adhering to the photosensitive drum.

The carrier collection device discussed in United States Patent Application Publication No. 2020/0292967 includes a collection roller and a magnet roller provided in the collection roller, and applies the voltage obtained by superimposing an alternating-current voltage on a direct-current voltage to the collection roller. With the configuration, carrier particles on the photosensitive drum are collected to the collection roller by a magnetic force with the magnet roller and an electrostatic force with the application voltage. When the carrier collection device collects carrier particles in the above-described manner, the toner can also be partially collected to the collection roller. Thus, in the configuration discussed in United States Patent Application Publication No. 2020/0292967, a toner removal mode is performed during a non-image formation. In the toner removal mode, while the photosensitive drum rotates at a lower speed than during the image formation, an alternating-current voltage is applied to the collection roller, returning toner adhering to the collection roller to the photosensitive drum.

The reduction of the rotation speed of the photosensitive drum in the toner removal mode as in the configuration discussed in United States Patent Application Publication No. 2020/0292967 involves changing the rotation speeds of the photosensitive drum between during the image formation and the toner removal mode. The toner removal mode cannot be performed during the image formation, which involves taking some time for the toner removal mode to be performed. This, however, increases the downtime in which no image formation can be performed. On the other hand, if the toner removal mode is performed without lowering the rotation speed of the photosensitive drum, that case involves taking a longer time of the toner removal mode for a sufficient removal of the toner adhering to the collection roller, which also results in an increase of the downtime.

SUMMARY OF THE DISCLOSURE

The present disclosure is directed to a technique providing an improved efficiency for removing toner on a collection roller while reducing the downtime.

According to an aspect of the present disclosure, an image forming apparatus configured to perform an image forming operation, the image forming apparatus includes a rotatable image carrying member on which an electrostatic latent image is formed, a developing device including a developer carrying member, the developing device being configured to contain a developer including toner and carrier, the developer carrying member being configured to carry the developer for developing the electrostatic latent image formed on the image carrying member into a toner image, a transfer member to which the toner image carried by the image carrying member is transferred, a carrier collection device including a rotatable collection roller, a magnet, and a conductor member, the carrier collection device being configured to collect the carrier from the image carrying member, the collection roller being disposed facing the image carrying member, downstream of a development portion where the electrostatic latent image formed on the image carrying member is developed, and upstream of a transfer portion where the toner image carried by the image carrying member is transferred to the transfer member in a rotation direction of the image carrying member, the magnet being non-rotatably disposed inside the collection roller, the conductor member being disposed facing the collection roller, a first bias application unit configured to apply a first bias obtained by superimposing a direct-current voltage and an alternating-current voltage, to the collection roller, and a second bias application unit configured to apply a second bias including the direct-current voltage, to the conductor member, wherein, during the image forming operation, an alternating-current electric field is formed between the collection roller to which the first bias is applied and the conductor member to which the second bias is applied.

According to another aspect of the present disclosure, an image forming apparatus configured to perform an image forming operation, the image forming apparatus includes a rotatable image carrying member on which an electrostatic latent image is formed, a developing device including a developer carrying member, the developing device being configured to contain a developer including toner and carrier, the developer carrying member being configured to carry the developer for developing the electrostatic latent image formed on the image carrying member into a toner image, a transfer member to which the toner image carried by the image carrying member is transferred, a carrier collection device including a rotatable collection roller, a magnet, and a conductor member, the carrier collection device being configured to collect the carrier from the image carrying member, the collection roller being disposed facing the image carrying member, downstream of a development portion where the electrostatic latent image formed on the image carrying member is developed, and upstream of a transfer portion where the toner image carried by the image carrying member is transferred to the transfer member in a rotation direction of the image carrying member, the magnet being non-rotatably disposed inside the collection roller, the conductor member being disposed facing the collection roller; and a bias application unit configured to apply a bias obtained by superimposing a direct-current voltage and an alternating-current voltage, to the collection roller, wherein the conductor member is grounded, and wherein, during the image forming operation, an alternating-current electric field is formed between the collection roller to which the bias is applied and the conductor member.

Further features of the present disclosure will become apparent from the following description of exemplary embodiments with reference to the attached drawings.

DESCRIPTION OF THE EMBODIMENTS

Figure 1:
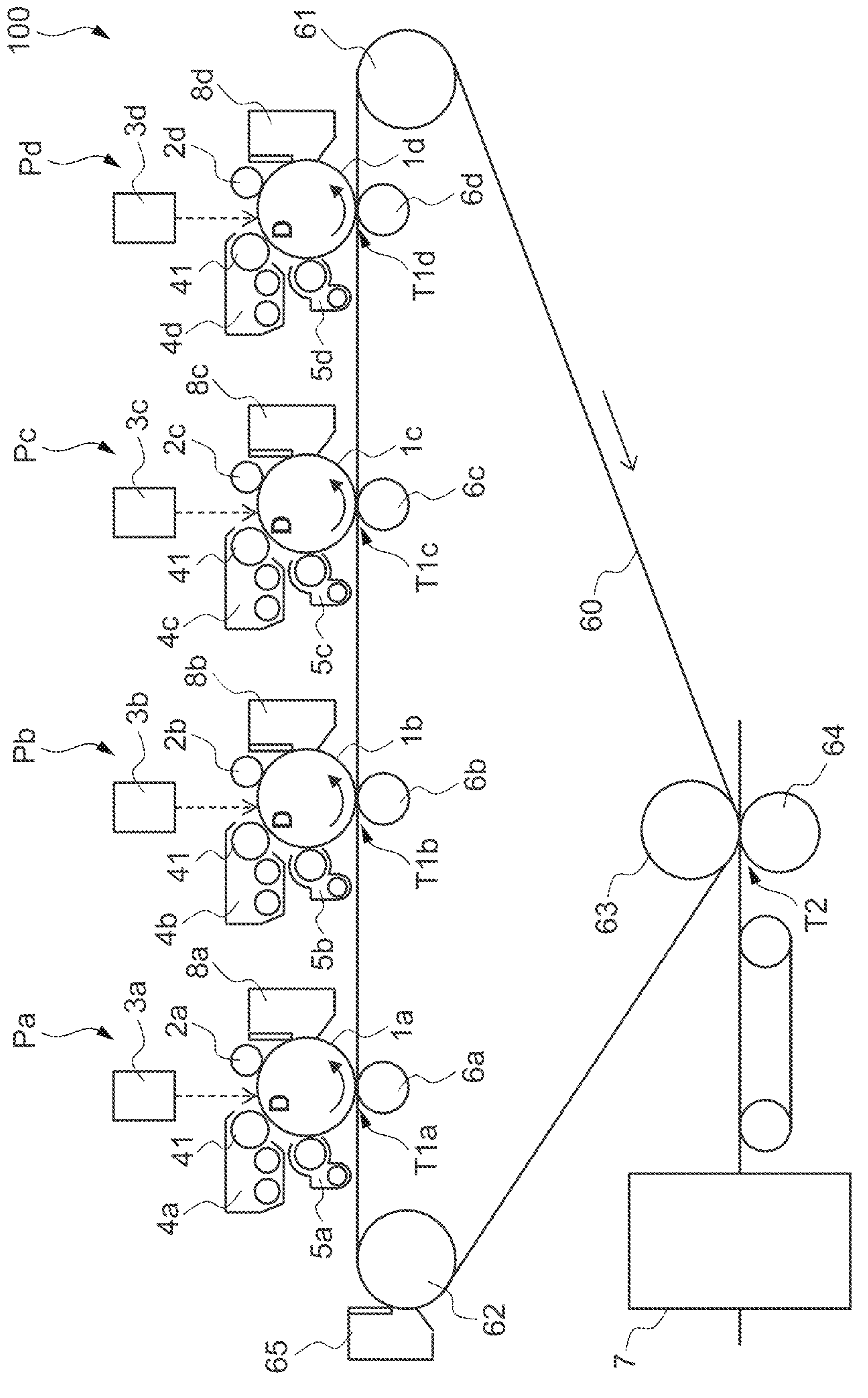
FIG. 1 is a schematic cross-sectional view illustrating the configuration of an image forming apparatus according to an exemplary embodiment.

An exemplary embodiment will now be described with reference to FIG. 1 to FIG. 11. The schematic configuration of an image forming apparatus 100 according to the present exemplary embodiment is described with reference to FIG. 1.

[Image Forming Apparatus]

The image forming apparatus 100 according to the present exemplary embodiment is a full-color image forming apparatus 100 with an electrophotographic system, and includes four image forming units Pa, Pb, Pc, and Pd. Each of the image forming units has substantially the same configuration except for the different developing colors. In the following, unless a discrimination is stated, the image forming unit Pa is described as a representative, and suffixes b, c, and d that indicate configurations of the respective other image forming units are each appended to the corresponding image forming unit of the other image forming units, and the detailed description will be omitted.

The image forming unit Pa includes a photosensitive drum 1*a* as an image carrying member that carries an electrostatic latent image on its surface. The photosensitive drum 1*a* is an example of an electrophotographic photosensitive body, and has a cylindrical shape. The photosensitive drum 1*a* rotates in the arrow direction (counterclockwise direction) in FIG. 1. A charger 2*a* as a charging unit, a laser beam scanner 3*a* as a latent image forming unit, a developing device 4*a*, a primary transfer roller 6*a*, a cleaning device 8*a*, a carrier collection device 5*a* are disposed around the photosensitive drum 1*a*.

An entire sequence of image forming in the image forming apparatus 100 having the above-described configuration will be described.

First, the surface of the photosensitive drum 1*a* is uniformly charged to a predetermined charged potential by the charger 2*a*. The photosensitive drum 1*a* charged by the charger 2*a* is scanned with and exposed to laser beams modulated based on image signals, from the laser beam scanner 3*a* as an example of an exposure device.

The laser beam scanner 3*a* is controlled based on input image data, and image data for emitting laser beams is input from an external terminal, such as a document reader and a personal computer (PC). The surface potential of the photosensitive drum 1*a* charged by the charger 2*a* is changed at image portions by laser beams from the laser scanner 3*a*, and an electrostatic latent image is formed on the photosensitive drum 1*a*.

The electrostatic latent image formed on the photosensitive drum 1*a* in the above-described manner is reversely developed with toner by the developing device 4*a*, into a visible image, or a toner image. In the present exemplary embodiment, the developing device 4*a* uses a two-component development system using a developer including a non-magnetic toner and a magnetic carrier. In other words, each of the developing devices 4*a*, 4*b*, 4*c*, and 4*d* stores a two-component developer including a toner for its corresponding color. More specifically, the developing device 4*a* stores yellow (Y) toner, the developing device 4*b* stores magenta (M) toner, the developing device 4*c* stores cyan (C) toner, and the developing device 4*d* stores black (K) toner. Accordingly, when the above-described step is performed by each of the image forming units Pa, Pb, Pc, and Pd, toner images in four colors, yellow, magenta, cyan, and black, are formed on photosensitive drums 1*a*, 1*b*, 1*c*, and 1*d*, respectively.

An intermediate transfer belt 60 as an intermediate transfer member is disposed below the image forming units Pa, Pb, Pc, and Pd. The intermediate transfer belt 60 is stretched over rollers 61, 62, and 63, and is movable in the arrow direction. A secondary transfer roller 64 is disposed outside the intermediate transfer belt 60 stretched on the roller 63. The secondary transfer roller 64 is configured to allow a recording medium to pass through between the secondary transfer roller 64 and the intermediate transfer belt 60. Examples of the recording medium include sheets and plastic sheets.

The toner images on the photosensitive drums 1*a*, 1*b*, 1*c*, and 1*d* are sequentially primarily transferred to the intermediate transfer belt 60 by primary transfer rollers 6*a*, 6*b*, 6*c*, and 6*d* as primary transfer members at primary transfer portions T1*a*, T1*b*, T1*c*, and T1*d* as transfer portions. As a result, the toner images in four colors, yellow, magenta, cyan, and black, are superimposed on the intermediate transfer belt 60, forming a full-color image. The toner remaining on the photosensitive drum 1*a* that is not transferred to the intermediate transfer belt 60 is collected to the cleaning device 8*a*.

The full-color image on the intermediate transfer belt 60 is secondarily transferred to a recording medium fed from a feeding unit (not illustrated) by action of the secondary transfer roller 64 at a secondary transfer portion T2 the secondary transfer roller 64 and the intermediate transfer belt 60 form. The toner remaining on the surface of the intermediate transfer belt 60 that is not transferred to the recording medium is collected to an intermediate transfer belt cleaning device 65. The recording medium to which the toner image is transferred is conveyed to a fixing unit 7, is subjected to image fixation, and is then discharged to the outside of the apparatus.

In the present exemplary embodiment, the developer stored in the developing device 4*a* is a two-component developer in which negatively-charged non-magnetic toner and magnetic carrier are mixed. A non-magnetic toner (hereinafter, toner) contains a colorant, a wax component, and other materials in a resin, such as polyester and styrene, and is obtained by pulverizing or polymerizing the resultant product into powder. A magnetic carrier (hereinafter, carrier) is obtained by coating, with a resin, the surface layer of a core that consists of resin particles kneaded with magnetic powder, such as ferrite particles.

A toner developing process on the photosensitive drum 1*a* by the developing device 4*a* will be described. The developing device 4*a* includes a developing sleeve 41 as a developer carrier. The developing sleeve 41 develops an electrostatic latent image on the photosensitive drum 1*a* with the toner at a developing portion D facing the photosensitive drum 1*a*, into the toner image. More specifically, the photosensitive drum 1*a* is uniformly charged to a charging potential by a direct-current voltage or the voltage obtained by superimposing an alternating-current voltage on a direct-current voltage applied to the charger 2*a*. The image portions are exposed to laser beams from the laser beam scanner 3*a*, making the potential at the exposed positions an exposure potential or exposure potentials, forming the electrostatic latent image on the photosensitive drum 1*a*. In the present exemplary embodiment, the voltage applied to the charger 2*a* is a voltage obtained by superimposing an alternating-current voltage of a sine wave having a peak-to-peak voltage of 1200 [V] and a frequency of 2 [kHz] on a direct-current voltage of −500 [V]. The application of the voltage makes the charging potential −500 [V], and the exposure potential −150 [V].

The developing device 4*a* conveys the developer to the developing portion D using the developing sleeve 41. A direct-current voltage or the voltage obtained by superimposing an alternating-current voltage on a direct-current voltage is applied to the developing sleeve 41. In the present exemplary embodiment, the voltage obtained by superimposing an alternating-current voltage of a rectangular wave having a duty ratio of 60%, a peak-to-peak voltage of 1400 [V], and a frequency of 12 [KHz] on a direct-current voltage of −350 [V] is applied to the developing sleeve 41. Through the electric field formed between the charged potential and the exposure potential of the photosensitive drum 1*a* and the developing sleeve 41, the negative toner in the developer is conveyed to the electrostatic latent image on the photosensitive drum 1*a* at the exposure potential to be developed.

[Carrier Collection Device]

Figure 2:
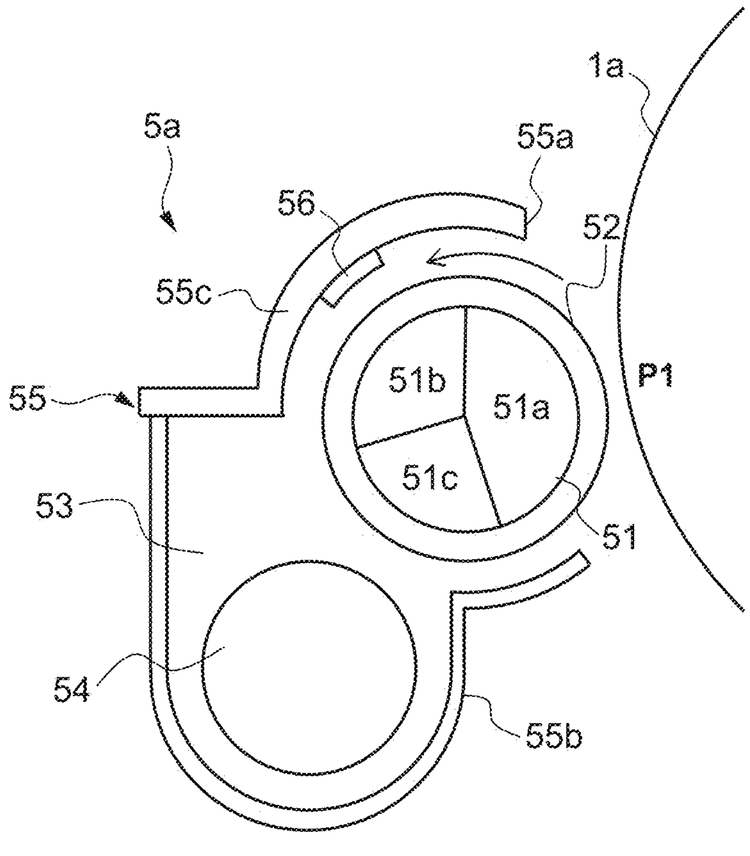
FIG. 2 is a schematic cross-sectional view illustrating the configuration of a carrier collection device according to the exemplary embodiment.

Carrier collection devices 5*a*, 5*b*, 5*c*, and 5*d* will be described with reference to FIGS. 1 and 2. The carrier collection devices 5*a*, 5*b*, 5*c*, and 5*d* have the same configuration as each other. The following is a description of the carrier collection device 5*a* as a representative. As illustrated in FIG. 1, the carrier collection device 5*a* collects carrier particles adhering to the photosensitive drum 1*a* downstream of the developing portion D (a region where the developing device 4*a* and the photosensitive drum 1*a* are close to each other) and upstream of the primary transfer portion T1*a* (a region where the primary transfer roller 6*a* and the photosensitive drum 1*a* are close to each other) in the rotation direction of the photosensitive drum 1*a*. As illustrated in FIG. 2, the carrier collection device 5*a* includes a collection roller 52 that rotates at a position facing the photosensitive drum 1*a*, a magnet roller 51 as a magnetic field generation unit that is non-rotatably disposed inside the collection roller 52 and attracts the carrier to the surface of the collection roller 52 by magnetic force, a collection chamber 53, a conveyance screw 54 conveying the carrier collected in the collection chamber 53, and a conductor member 56. These members are disposed in a collection container 55.

The magnet roller 51 includes a plurality of (three in the present exemplary embodiment) magnetic poles (magnet pieces) 51*a*, 51*b*, and 51*c*. The magnetic pole 51*a* is disposed at a position facing the photosensitive drum 1*a* with the collection roller 52 in between. The magnetic pole 51*a* is a magnetic pole for attracting the carrier adhering to the outer peripheral surface of the photosensitive drum 1*a*, and is therefore disposed at a position P1 where the photosensitive drum 1*a* and the collection roller 52 are closest to each other. The magnetic pole 51*b* is disposed downstream of the magnetic pole 51*a* in the rotation direction of the collection roller 52, and has the polarity different from that of the magnetic pole 51*a*. The magnetic pole 51*c* is disposed adjacent to and downstream of the magnetic pole 51*b* in the rotation direction of the collection roller 52, and has the same polarity as that of the magnetic pole 51*b*.

The collection roller 52 rotates in the arrow direction in FIG. 2, and attracts the carrier adhering to the photosensitive drum 1*a* to the surface of the collection roller 52 through the magnetic field formed with the magnetic pole 51*a* disposed at the closest position to photosensitive drum 1*a*. The attracted carrier is conveyed by the rotation of the collection roller 52, and is peeled off into the collection chamber 53 with a repulsive magnetic field formed with the magnetic poles 51*b* and 51*c*.

In place of or in addition to the configuration of the repulsive magnetic field formed with the magnetic poles 51*b* and 51*c*, a blade can be disposed facing the collection roller 52 to peel off the carrier from the collection roller 52. For example, the blade can be disposed facing the collection roller 52, with a gap, downstream of the position where the collection roller 52 faces the photosensitive drum 1*a* in the rotation direction of the collection roller 52.

The conveyance screw 54 as a carrier conveyance member includes a rotary shaft made of a nonmagnetic metal, and a blade made of a resin in a spiral shape around the rotary shaft. The conveyance screw 54 rotates to convey the fallen carrier from the collection roller 52 in the rotation axis direction. In the present exemplary embodiment, the rotation axis direction of the conveyance screw 54 and the rotation axis direction of the collection roller 52 are substantially parallel to each other.

Figure 3:
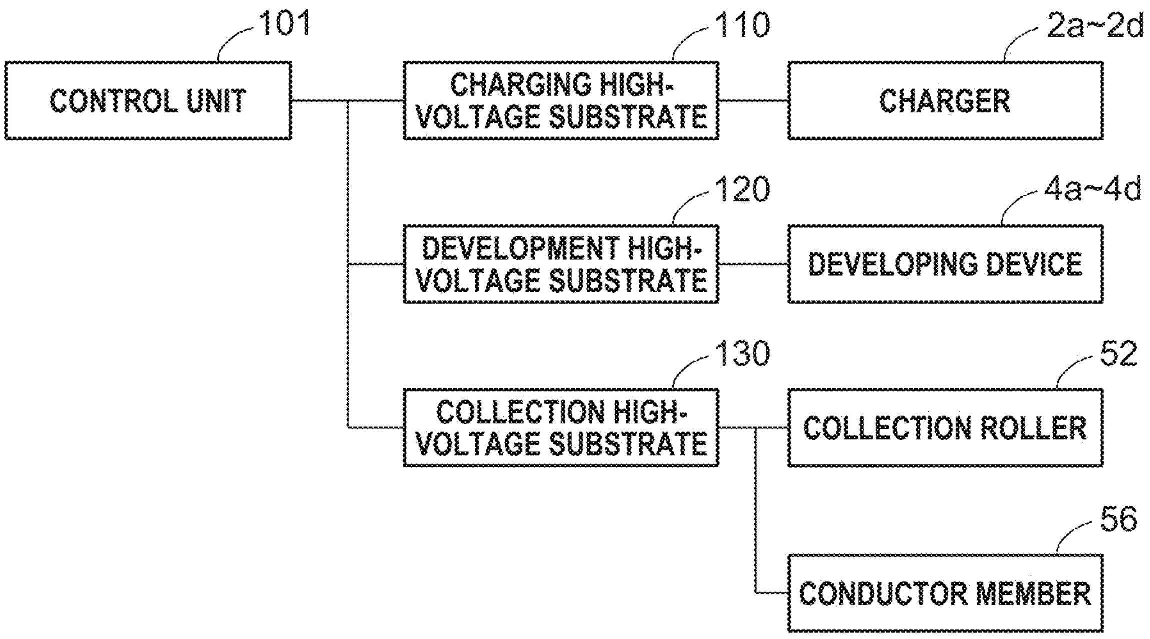
FIG. 3 is a control block diagram of the image forming apparatus according to the exemplary embodiment.

The voltage obtained by superimposing an alternating-current voltage on a direct-current voltage is applied to the collection roller 52 from a collection high-voltage substrate 130 (see FIG. 3) as a voltage (bias) application unit. As illustrated in FIG. 3, the collection high-voltage substrate 130 is controlled by a control unit 101, and can apply the voltage (bias) obtained by superimposing the alternating-current voltage on the direct-current voltage, based on the operation of the carrier collection device 5*a*. The conductor member 56 will be described below.

[Control Configuration]

FIG. 3 is a block diagram illustrating a part of a control configuration of the image forming apparatus 100 according to the present exemplary embodiment. In the present exemplary embodiment, voltages applied to the chargers 2*a* to 2*d* are generated by a charging high-voltage substrate 110 under the control of the control unit 101. Voltages applied to the developing sleeves 41 of the developing devices 4*a* to 4*d* are generated by a development high-voltage substrate 120 under the control of the control unit 101. Further, the voltages each obtained by superimposing the alternating-current voltage on the direct-current voltage is applied to the collection rollers 52 by the collection high-voltage substrate 130 under the control of the control unit 101. Direct-current components of the voltages applied to the collection rollers 52 have a difference of 100 [V] from the charged potentials of the photosensitive drums 1*a* to 1*d* in order to prevent the negatively-charged toner developed to the electrostatic latent images on the photosensitive drums 1*a* to 1*d* from moving to the collection rollers 52. In the present exemplary embodiment, the voltages are −600 [V]. Alternating-current components of the voltages applied to the collection rollers 52 are designed to improve the property of collecting the carrier adhering to the photosensitive drums 1*a* to 1*d*. In the present exemplary embodiment, the alternating-current components of the voltages are rectangular waves each having a duty ratio of 50%, a peak-to-peak voltage of 1500 [V], and a frequency of 5 [KHz]. The carrier collection devices 5*a* to 5*d* collect carrier particles adhering to the photosensitive drums 1*a* to 1*d* by the forces of the magnetic fields formed by the magnet rollers 51 and force of the electric fields between the collection rollers 52 and the photosensitive drums 1*a* to 1*d* formed by voltages applied to the collection rollers 52, respectively.

[Toner Adhesion on Collection Roller]

Toner adhesion to the collection rollers 52 will now be described. As described above, the voltages are applied to the collection rollers 52 in order to facilitate collection of the carrier on the surfaces of the photosensitive drums 1*a* to 1*d* at the positions P1 where the photosensitive drums 1*a* to 1*d* and the respective collection rollers 52 are closest to each other. At this time, so-called fog toner on the surfaces of the photosensitive drums 1*a* to 1*d* is also collected by the respective collection rollers 52. In other words, the toner adheres to the collection rollers 52.

The toner inside the developing devices 4*a* to 4*d* is negatively-charged, whereas most of the toner adhering to the collection rollers 52 is weakly-charged toner mainly having no charge (i.e., toner having a charge amount of zero or close to zero), or reversely-charged toner (i.e., positively-charged toner). Such toner adheres to the background of an image as fog toner. The toner in the normally charged state adheres to the photosensitive drums 1*a* to 1*d* by electrostatic force, but the adhesion of the weakly-charged toner and the reversely-charged toner to the photosensitive drums 1*a* to 1*d* by electrostatic force is weak. The positions P1 where the collection rollers 52 and the respective photosensitive drums 1*a* to 1*d* are closest to each other facilitates transfer of weakly-charged toner and reversely-charged toner to the collection rollers 52.

Since the toner is a non-magnetic material, the toner transferred to the collection rollers 52 is not affected by the magnetic force generated from the magnetic poles of the magnet rollers 51, and is moved while being fixed to the surfaces of the collection rollers 52. When the toner reaches the magnetic poles 51*b* and 51*c* as peeling pole portions, the toner is rubbed by the carrier staying at the peeling pole portions, is accumulated together with the carrier, and is eventually collected into the collection chambers 53.

Insufficient amounts of carrier on the collection rollers 52 lead to insufficient amounts of carrier staying at the peeling pole portions, which results in insufficient collections of the toner at the peeling pole portions. In this case, the toner is accumulated on the collection rollers 52. When gaps between the photosensitive drums 1*a* to 1*d* and the respective collection rollers 52 are filled with the toner on the collection rollers 52, toner on the collection rollers 52 again adheres to the photosensitive drums 1*a* to 1*d* (so-called toner dripping occurs). As a result, toner is transferred to an output product as an image noise. In the present exemplary embodiment, the toner adhering to the collection rollers 52 is collected by the conductor members 56 described immediately below.

[Conductor Member]

Figure 4:
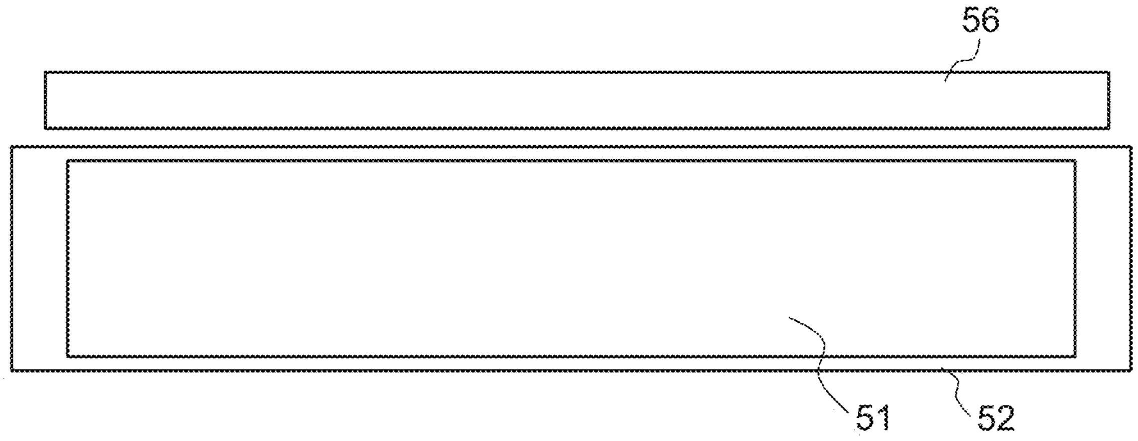
FIG. 4 is a schematic diagram illustrating a relationship between a magnet roller, a collection roller, and a conductor member in a longitudinal direction according to the exemplary embodiment.

The conductor members 56 will now be described. While the following is a description of the carrier collection device 5*a*, the carrier collection devices 5*b* to 5*d* have the same configuration as each other. As illustrated in FIG. 2, the conductor member 56 is disposed facing the collection roller 52 downstream of the position where the collection roller 52 is closest to the photosensitive drum 1*a* (closest position P1) in the rotation direction of the collection roller 52. As illustrated in FIG. 4, the conductor member 56 is also disposed such that its ends are positioned outside each end of the magnet roller 51 in the rotation axis direction (a longitudinal direction or right-left direction in FIG. 4) of the collection roller 52. In the following, a specific description will be given.

As illustrated in FIG. 2, the carrier collection device 5*a* includes the collection container 55. An opening 55*a* is provided at a position facing the photosensitive drum 1*a* at a part of the collection container 55. The collection roller 52 is disposed inside the collection container 55 facing the photosensitive drum 1*a* via the opening 55*a*. The conductor member 56 is fixed to the inner wall of the collection container 55 where the conductor member 56 faces the collection container 55. The collection container 55 further includes a main body portion 55*b* including the collection chamber 53, and an upper lid 55*c* covering an upper part of the main body portion 55*b*. In the present exemplary embodiment, the conductor member 56 is disposed facing the collection roller 52 and on the inner wall of the upper lid 55*c*. Thus, the conductor member 56 is disposed upstream of a position where the collection roller 52 faces the collection chamber 53 in the rotation direction of the collection roller 52. Further, in the present exemplary embodiment, the conductor member 56 is disposed above the rotation axis of the collection roller 52 in the vertical directions.

The surface of the upper lid 55*c* facing the collection roller 52 has a curved shape along the surface of the collection roller 52. The conductor member 56 is fixed in a curved state along the curved surface of the upper lid 55*c*. The conductor member 56 has a function as a toner collection section mainly collecting low-charged toner collected together with the carrier on the photosensitive drum 1*a* by the collection roller 52.

The conductor member 56 is a sheet-like member including a metal layer provided on the surface of its resin layer. In the present exemplary embodiment, the conductor member 56 is a member having a layer configuration in which an aluminum foil is vapor-deposited on a polyester film, and has a sheet shape with a width (the length in a direction orthogonal to the longitudinal direction) of 4 mm. As the conductor member 56, for example, ALPET® is available from PANAC Co., Ltd.

The conductor member 56 extends in substantially parallel with the longitudinal direction of the collection roller 52. FIG. 4 illustrates a relationship between lengths of the magnet roller 51, the collection roller 52, and the conductor member 56 in the longitudinal direction. The conductor member 56 is longer than the magnet roller 51, but is shorter than the collection roller 52 in the longitudinal direction. In other words, both ends of the conductor member 56 are positioned outside each end of the magnet roller 51, but are positioned inside each end of the collection roller 52 in the longitudinal direction of the collection roller 52. On the outer circumferential surface of the collection roller 52, a region where the carrier is attracted to the collection roller 52 by magnetic force of the magnet roller 51 passes through a position facing the conductor member 56 with rotation of the collection roller 52.

In the present exemplary embodiment, as illustrated in FIG. 3, a direct-current voltage is applied to the conductor member 56 by the collection high-voltage substrate 130 as a voltage (bias) application unit. In other words, the collection high-voltage substrate 130 outputs predetermined voltages to the collection roller 52 and the conductor member 56.

Figure 5:
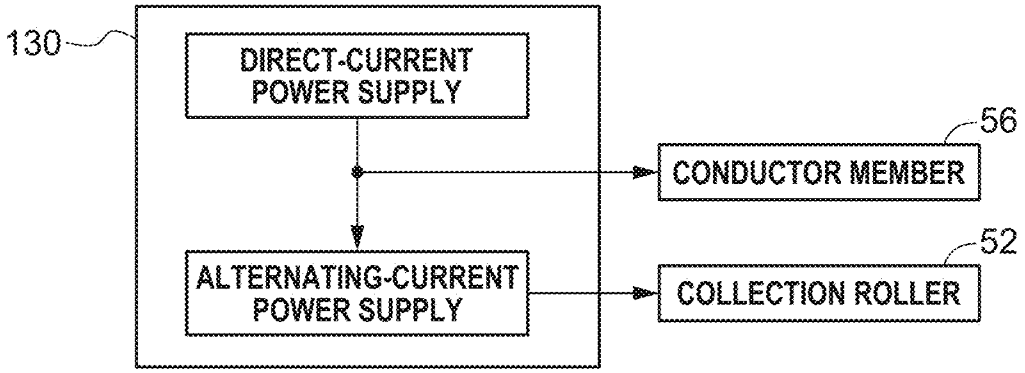
FIG. 5 is a block diagram illustrating the configuration of voltage application to the conductor member and the collection roller according to the exemplary embodiment.

FIG. 5 is a schematic diagram illustrating the configuration of voltage application to the collection roller 52 and the conductor member 56.

As described above, the direct-current voltage is applied to the conductor member 56. The direct-current voltage applied to the conductor member 56 is the direct-current component alone as the voltage applied from the collection high-voltage substrate 130 common to the collection roller 52. In the present exemplary embodiment, a direct-current voltage of −600 [V] is applied to the conductor member 56.

As described above, the direct-current component voltage is applied to the conductor member 56 and the collection roller 52 from the collection high-voltage substrate 130. Thus, when an image forming operation is started, the conductor member 56 and the collection roller 52 have the same direct-current potential at the same timing. Thus, an alternating-current electric field is formed between the conductor member 56 and the collection roller 52 by the alternating-current voltage applied to the collection roller 52. The electric field causes low-charged toner on the collection roller 52 to be collected to the conductor member 56. In other words, in the present exemplary embodiment, toner is removed from the collection roller 52 by the conductor member 56 in parallel with the operation of collecting the carrier by the collection roller 52 during an image forming operation.

Figure 6:
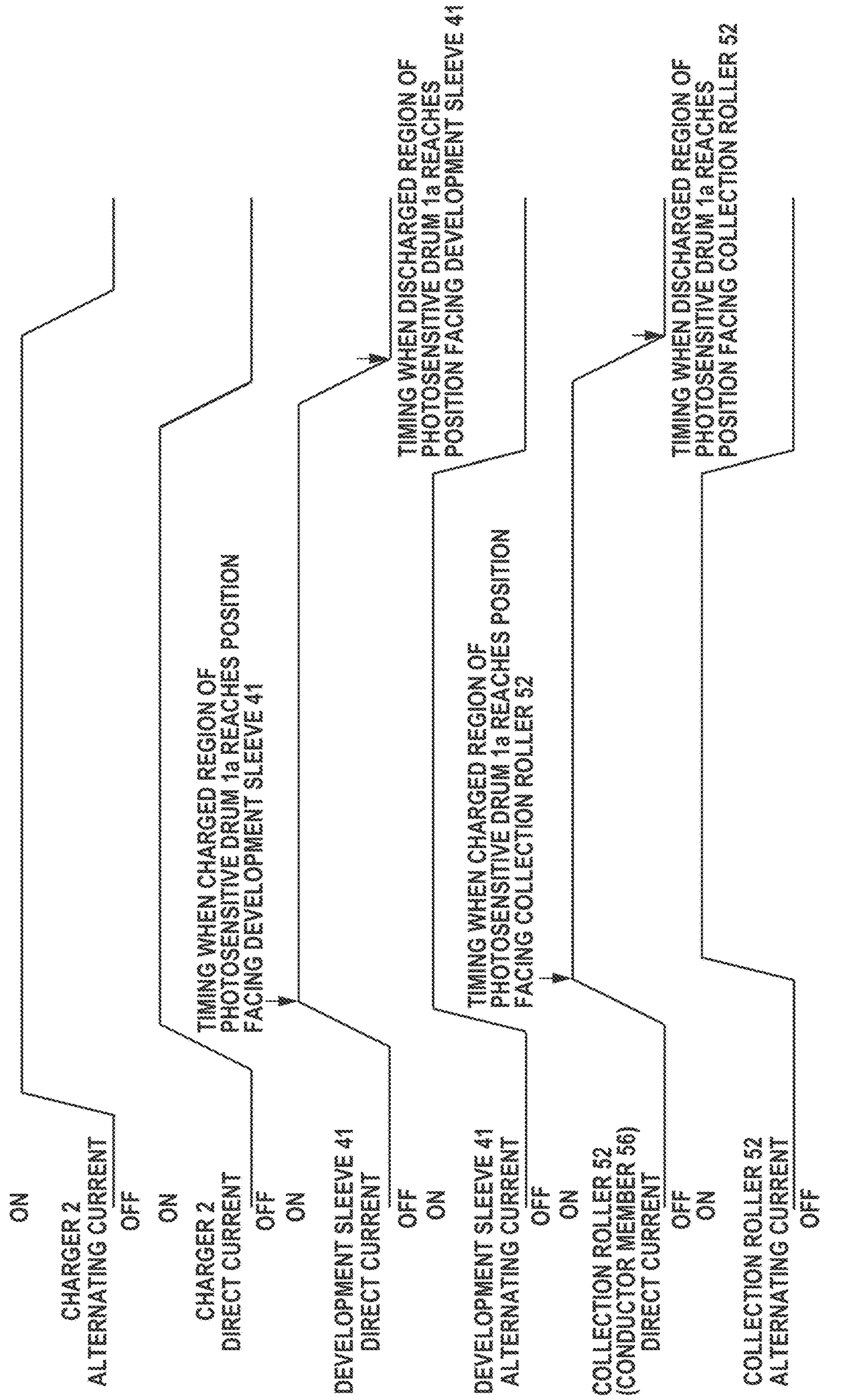
FIG. 6 is a timing chart illustrating timings of voltage application to components according to the exemplary embodiment.

FIG. 6 is a timing chart illustrating start/end timings of voltage application at the startup and end of an image forming operation. While the image forming unit Pa is described with reference to FIG. 6, the other image forming units Pb to Pd are operated in the same manner. Voltage applications are started with (turned on) the alternating-current voltage of the charger 2*a* and then the direct-current voltage of the charger 2*a*, the direct-current voltage of the developing sleeve 41 of the developing device 4*a* and then the alternating-current of the developing sleeve 41, and the direct-current voltage of the collection roller 52 and then the alternating-current of the collection roller 52, sequentially. At the timing when the direct-current voltage is applied to the collection roller 52, the direct-current voltage is also applied to the conductor member 56.

At the timing when the photosensitive drum 1*a* charged by the charger 2*a* reaches the position facing the developing sleeve 41, the direct-current voltage of the developing sleeve 41 rises. Further, at the timing when the photosensitive drum 1*a* reaches the position facing the collection roller 52, the direct-current voltage of the collection roller 52 rises. This is designed to prevent toner and carrier on the developing sleeve 41 or the collection roller 52 from unintentionally adhering to the photosensitive drum 1*a* due to a mismatch of the timings of voltage applications to the developing sleeve 41 and the collection roller 52 for the region of the photosensitive drum 1*a* charged to the charged potential.

When the voltage applications are ended (turned off), the alternating-current voltages of the developing sleeve 41 and the collection roller 52 are first turned off. The direct-current voltages of the charger 2*a*, the developing sleeve 41, and the collection roller 52 are then turned off in this order. At the timing when the charging of the photosensitive drum 1*a* by the charger 2*a* ends, the photosensitive drum 1*a* is discharged, and the region reduced to 0 [V] reaches the position facing the developing sleeve 41, the direct-current voltage of the developing sleeve 41 is turned off. Further, at a timing when the region reduced to 0 [V] reaches the position facing the collection roller 52, the direct-current voltage of the collection roller 52 is turned off. This is designed to prevent toner and carrier on the developing sleeve 41 or the collection roller 52 from unintentionally adhering to the photosensitive drum 1*a* due to a mismatch of the timings of ending voltage applications of the developing sleeve 41 and the collection roller 52 for the charged region of the photosensitive drum 1*a*, as with the application start timings. Finally, the alternating-current voltage of the charger 2*a* is turned off. In the present exemplary embodiment, the application start/end timings of the conductor member 56 are synchronized with those of the collection roller 52 since the direct-current component voltage by the collection high-voltage substrate 130 common to the collection roller 52 is applied to the conductor member 56.

As described above, in the present exemplary embodiment, the conductor member 56 is provided in the carrier collection device 5*a*, and the electric field is formed between the collection roller 52 and the conductor member 56, which makes it possible to remove toner accumulated on the collection roller 52 during an image forming operation. Thus, the configuration according to the present exemplary embodiment enables removal of toner from the collection roller 52 without increasing the downtime.

If the distance between the conductor member 56 and the collection roller 52 is excessively small, a leakage phenomenon can occur, whereas if the distance is excessively large, the effect by the electric field is weakened, reducing the effect on the toner collection. As a result, the distance between the conductor member 56 and the collection roller 52 desirably falls within the range of 0.2 [mm] to 3.0 [mm] at the closest position. In the present exemplary embodiment, the distance is 0.5 [mm].

In the longitudinal direction of the collection roller 52, the phenomenon that the toner adheres to the collection roller 52 remarkably occurs in the region where the magnet roller 51 is present. The conductor member 56 is, thus, desirably longer than the magnet roller 51 in the longitudinal direction as illustrated in FIG. 4, described above.

When the image forming operation is repeated, the collected toner is accumulated on the conductor member 56. When the accumulated toner falls on the photosensitive drum 1*a*, or adheres to the photosensitive drum 1*a* again via the collection roller 52, an image stain can occur. The conductor member 56 is, thus, desirably disposed above the collection roller 52 in the vertical directions. Even when the toner is continuously accumulated on the conductor member 56, the arrangement prevents an image stain caused by toner being rubbed with the collection roller 52 and adhered to the photosensitive drum 1*a* from occurring.

The conductor member 56 is desirably disposed downstream of the position (closest position P1) where the collection roller 52 faces the photosensitive drum 1*a* in the rotation direction of the collection roller 52 and upstream of the position where the collection roller 52 faces the collection chamber 53. Even when toner accumulated on the conductor member 56 falls on the collection roller 52, the arrangement enables collection of the toner to the collection chamber 53 before the toner is conveyed to the position facing the photosensitive drum 1*a*.

[Voltage Applied to Conductor Member 56]

In the developing device 4*a*, the toner charged by friction with the carrier basically has the negative polarity. The toner adhering to the collection roller 52, however, mainly includes toner with an extremely low negative charge or toner with a reverse polarity charge. In the present exemplary embodiment, the polarity of the direct-current voltage applied to the collection roller 52 is negative, and has a potential difference from the charged potential as described above. Further, the voltage applied to the conductor member 56 as the direct-current component of the voltage applied to the collection roller 52 makes the conductor member 56 and the collection roller 52 have the same potential, whereby the alternating-current electric field collects toner on the collection roller 52. In other words, in the present exemplary embodiment, the direct-current voltage applied to the conductor member 56 is equal in magnitude to the direct-current voltage applied to the collection roller 52. Even when the potential relationship between the collection roller 52 and the conductor member 56 is changed to other relationships, similar effects are achievable. Modifications will now be described in which the configuration of the voltage application to the collection roller 52 and the conductor member 56 is changed.

A first modification will be described. In the first modification, the voltage is applied to the conductor member 56 with a configuration illustrated in FIG. 7A. More specifically, the peak value in the positive direction of the alternating-current voltage applied to the collection roller 52 is held through a rectifier substrate 200, and the resultant voltage is applied to the conductor member 56. As described above, the voltage applied to the collection roller 52 is a voltage obtained by superimposing the alternating-current voltage having a duty ratio of 50%, a peak-to-peak voltage of 1500 [V], and a frequency of 5 [KHz], on a direct-current voltage of −600 [V]. In the first modification, the voltage applied to the conductor member 56 is +150 [V].

Figure 7A:
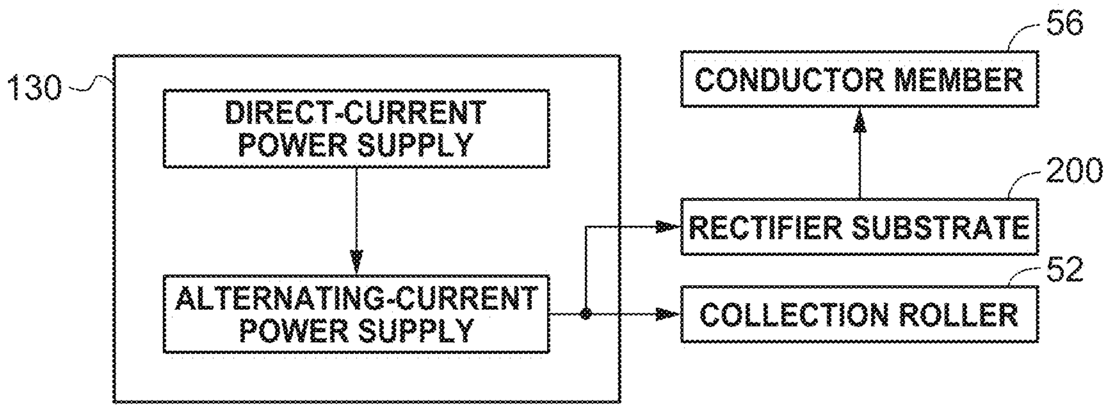
FIG. 7A is a block diagram illustrating the configuration of voltage application to a conductor member and a collection roller according to a first modification.
Figure 7B:
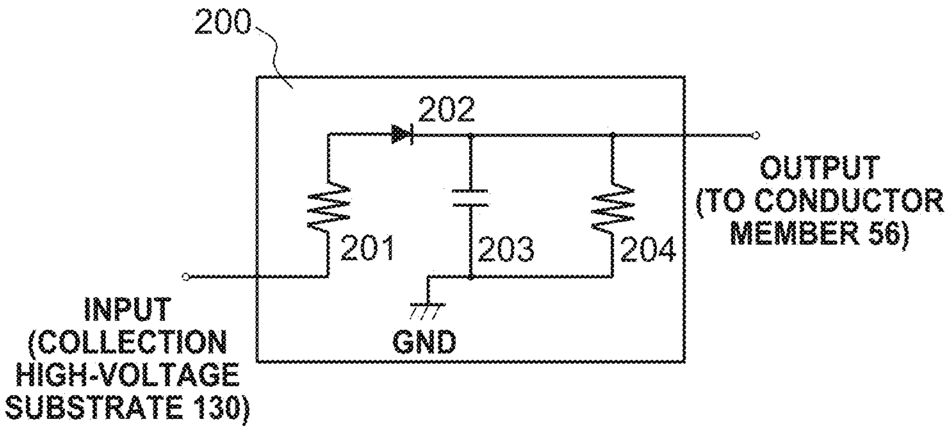
FIG. 7B is a circuit diagram of a rectifier substrate according to the first modification.

As illustrated in FIG. 7B, the rectifier substrate 200 includes resistors 201 and 204, a diode 202, and a capacitor 203, holds the peak value in the positive direction of the voltage applied to the collection roller 52, and outputs the resultant voltage to the conductor member 56. In the first modification, a direct-current voltage of −600 [V] is applied to the collection roller 52, and a direct-current voltage of +150 [V] is applied to the conductor member 56. Thus, the potential difference of the conductor member 56 from the collection roller 52 is +750 [V]. In other words, in the first modification, the direct-current voltage applied to the conductor member 56 is a voltage of a magnitude at which the difference from the direct-current voltage applied to the collection roller 52 has the positive polarity.

A second modification will be described. In the second modification, the voltage is applied to the conductor member 56 with a configuration illustrated in FIG. 8A. More specifically, the peak value in the negative direction of the alternating-current voltage applied to the collection roller 52 is held through a rectifier substrate 210, and the resultant voltage is applied to the conductor member 56. In the second modification, the voltage applied to the conductor member 56 is −1350 [V].

Figure 8A:
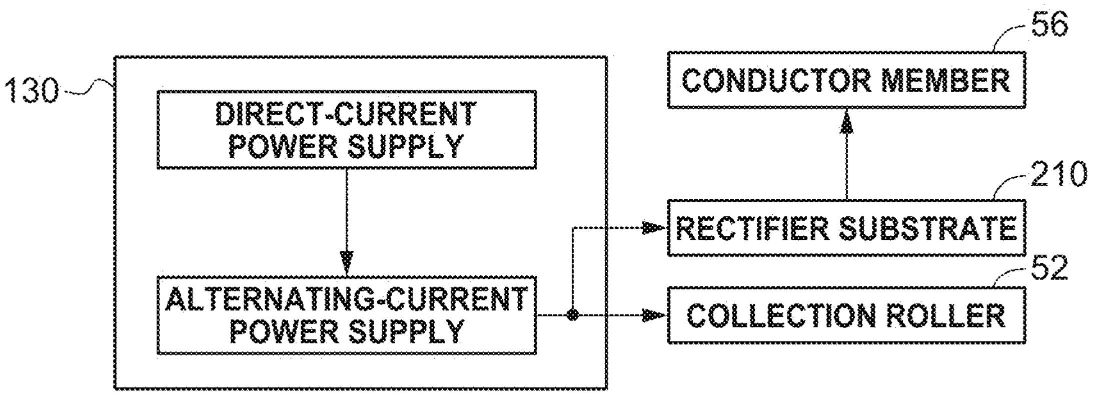
FIG. 8A is a block diagram illustrating the configuration of voltage application to a conductor member and a collection roller according to a second modification.
Figure 8B:
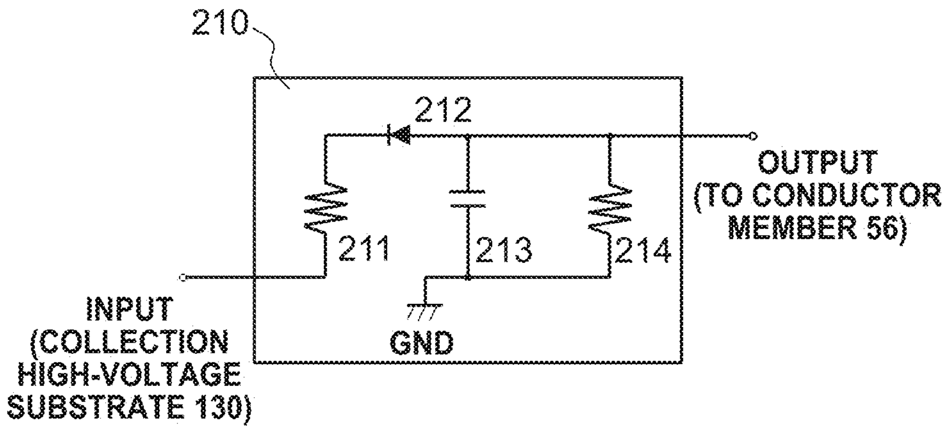
FIG. 8B is a circuit diagram of a rectifier substrate according to the second modification.

As illustrated in FIG. 8B, the rectifier substrate 210 includes resistors 211 and 214, a diode 212, and a capacitor 213. The diode 212 is disposed in such a manner that the anode and cathode of the diode 202 in the rectifier substrate 200 illustrated in FIG. 7B are interchanged with each other. With the configuration, the rectifier substrate 210 holds the peak value in the negative direction of the voltage applied to the collection roller 52, and outputs the resultant voltage to the conductor member 56. In the second modification, a direct-current voltage of −600 [V] is applied to the collection roller 52, and a direct-current voltage of −1350 [V] is applied to the conductor member 56. Thus, the potential difference of the conductor member 56 from the collection roller 52 is −750 [V]. In other words, in the second modification, the direct-current voltage applied to the conductor member 56 is a voltage of a magnitude at which the difference from the direct-current voltage applied to the collection roller 52 has the negative polarity.

Figure 9:
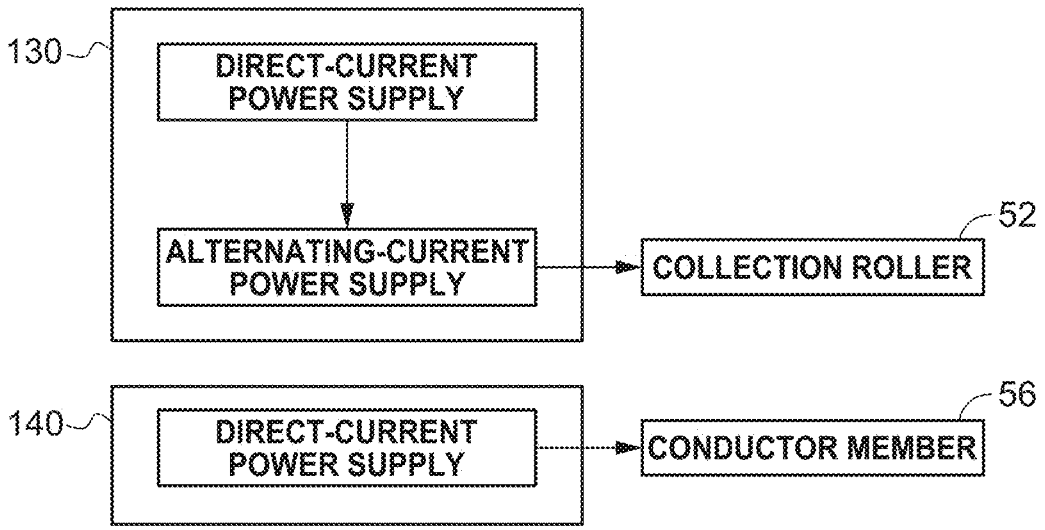
FIG. 9 is a block diagram illustrating the configuration of voltage application to a conductor member and a collection roller according to a third modification.
Figure 10:
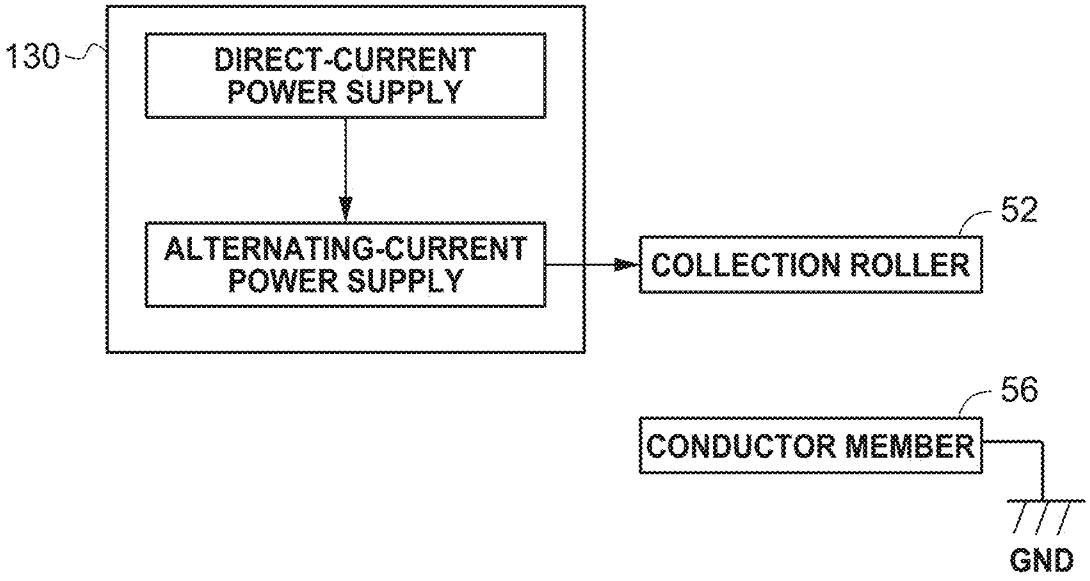
FIG. 10 is a block diagram illustrating a relationship between a conductor member and the configuration of voltage application to a collection roller according to a fourth modification.

A third modification will be described. In the third modification, the voltage applied to the conductor member 56 is a direct-current voltage applied from a toner collection high-voltage substrate 140, different from the collection high-voltage substrate 130 applying the voltage to the collection roller 52, as illustrated in FIG. 9, and the voltage applied to the conductor member 56 is −300 [V]. In other words, in the third modification, the toner collection high-voltage substrate 140 as a second voltage application unit is provided, in addition to the collection high-voltage substrate 130 as a first voltage application unit. The toner collection high-voltage substrate 140 includes a direct-current power supply. The collection high-voltage substrate 130 applies the voltage to the collection roller 52, and the toner collection high-voltage substrate 140 applies the direct-current voltage to the conductor member 56.

When an image forming operation is started, the toner collection high-voltage substrate 140 generates the direct-current voltage at the same timing as that of the collection high-voltage substrate 130, and applies the voltage to the conductor member 56. In the third modification, a direct-current voltage of −600 [V] is applied to the collection roller 52, and a direct-current voltage of −300 [V] is applied to the conductor member 56. Thus, the potential difference of the conductor member 56 from the collection roller 52 is +300 [V]. In other words, in the third modification, the direct-current voltage applied to the conductor member 56 is a voltage of a magnitude at which the difference from the direct-current voltage applied to the collection roller 52 has the positive polarity, as in the first modification.

A fourth modification will be described. The fourth modification has a configuration in which the conductor member 56 is connected to a ground potential, illustrated in FIG. 10. In the fourth modification, the conductor member 56 is grounded, and the voltage is not applied from the collection high-voltage substrate 130 to the conductor member 56. In the fourth modification, a direct-current voltage of −600 [V] is applied to the collection roller 52, and the potential of the conductor member 56 is 0 [V]. Thus, the potential difference of the conductor member 56 from the collection roller 52 is +600 [V]. In the fourth modification, the direct-current voltage applied to the conductor member 56 is a voltage of a magnitude at which the difference from the direct-current voltage applied to the collection roller 52 has the positive polarity, as in the first modification.

Figure 11:
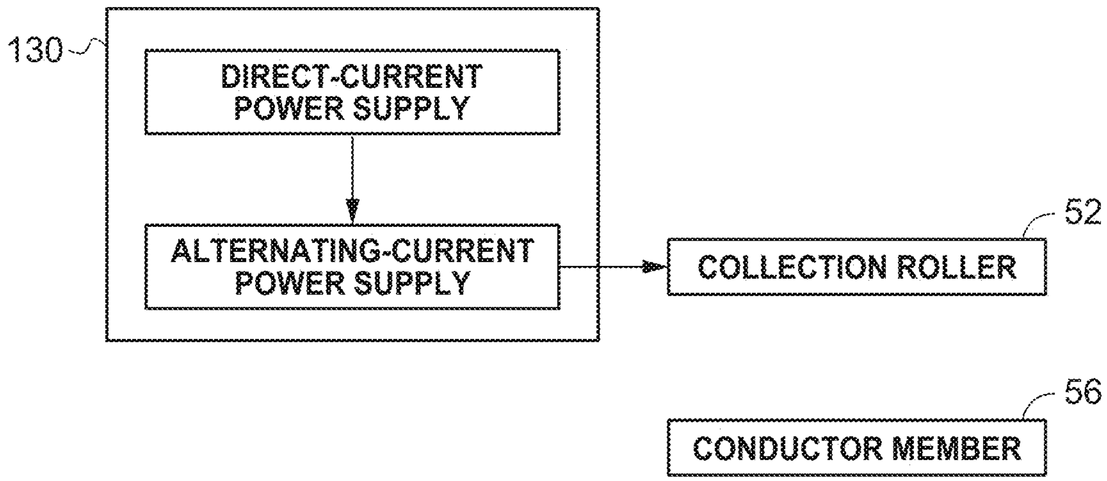
FIG. 11 is a block diagram illustrating a relationship between a conductor member and a configuration of voltage application to a collection roller according to a fifth modification.

A fifth modification will be described. In the fifth modification, as illustrated in FIG. 11, the conductor member 56 is connected to neither the high-voltage substrate nor the ground potential, and is put into a so-called floating state where its potential is not regulated. In the fifth modification, a direct-current voltage of −600 [V] is applied to the collection roller 52, whereas the potential of the conductor member 56 is unknown.

[Experiment]

Between the configuration according to the example as the above-described first exemplary embodiment and the configurations according to the above-described first to fifth modifications, the potential of each conductor member 56 was set with a similar amount of toner adhering to the collection rollers 52 (a toner weight per unit area was about 1.2 [mg/cm$^2$]), and the degree of toner remaining on each collection roller 52 after twenty rotations of the collection roller 52 was compared.

Table 1 illustrates the voltage applied to the conductor member 56, the potential difference between the conductor member 56 and the collection roller 52, the toner remaining percentage on the collection roller 52, and the complexity in each of the configurations. The toner remaining percentage on the collection roller 52 was calculated from a measurement value of toner weight on the collection roller 52 before and after the twenty rotations of the collection roller 52. As for "complexity and cost of configuration", the configuration that is not complicated and prevents an increase in cost was evaluated as "good". The configuration that is less complicated and prevents a more increase in cost compared with "good" was evaluated as "excellent", the configuration that is slightly more complicated and prevents an less increase in cost compared with "good" was evaluated as "slightly insufficient", and the configuration that is more complicated and prevents a slight increase in cost compared with "slightly insufficient" was evaluated as "insufficient".

TABLE 1

| | Potential [V] of Conductor Member 56 | Potential Difference [V] from Collection Roller 52 | Toner Remaining Percentage on Collection Roller 52 | Complexity and Cost of Configuration |
|---|---|---|---|---|
| Example | −600 | 0 | 3% | Good |
| First Modification | +150 | +750 | 5% | Slightly Insufficient |
| Second Modification | −1350 | −750 | 30% | Slightly Insufficient |
| Third Modification | −300 | +300 | 4% | Insufficient |
| Fourth Modification | 0 | +600 | 6% | Good |
| Fifth Modification | Unregulated | Unknown | 72% | Excellent |

In terms of "toner remaining percentage on collection roller 52" in Table 1, a good result is observed in the configuration according to the example in which the potential difference between the conductor member 56 and the collection roller 52 is equal or in the configuration according to each of the first, third, and fourth modifications in which the potential of the conductor member 56 is greater in the positive direction than that of the potential of the collection roller 52. This results from the adhered toner on the collection roller 52 having a low charge with a large percentage of the negatively charged toner.

In contrast, in the configuration according to the second modification in which the potential of the conductor member 56 is greater in the negative direction than that of the collection roller 52, the toner collection ratio is slightly lower than those in the configurations according to the example and the first, third, and fourth modifications. This results from the configuration according to the second modification facilitating collection of positively-charged toner and the slightly small percentage of positively-charged toner out of the toner adhering to the collection roller 52.

In the fifth modification, no connection to a high-voltage substrate or contact with the ground potential is necessary, resulting in a very simple configuration, which however provides a less effect of the toner collection than those in the configurations of the example and the other modifications.

The third modification includes the toner collection high-voltage substrate 140 added, which could cause increased cost and size of the apparatus. However, the toner collection high-voltage substrate 140 is independent of the collection high-voltage substrate 130, which makes it possible to determine the voltage irrespective of the voltage applied to the collection roller 52. This has advantages in facilitating change of the potential difference between the collection roller 52 and the conductor member 56 to an optimum value, and of the timings when the voltages are applied to the collection roller 52 and the conductor member 56, based on the environment where the image forming apparatus is used.

As described above, any configuration provides a certain effect while the degree varies depending on the potential relationship. While the conductor member 56 is not an insulator, such as a resin, but a conductor to have a uniform potential in its longitudinal direction, the potential relationship between the conductor member 56 and the collection roller 52 can be other than the above-described examples. When the potential difference from the collection roller 52 falls within a range of −1000 [V] to +1000 [V], leakage does not occur, providing a certain effect of collecting toner from the collection roller 52 during an image forming operation.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-130215, filed Aug. 9, 2023, which is hereby incorporated by reference herein in its entirety.

What is claimed is:

1. An image forming apparatus configured to perform an image forming operation, the image forming apparatus comprising:

a rotatable image carrying member on which an electrostatic latent image is formed;

a developing device including a developer carrying member, the developing device being configured to contain a developer including toner and carrier, the developer carrying member being configured to carry the developer for developing the electrostatic latent image formed on the image carrying member into a toner image;

a transfer member to which the toner image carried by the image carrying member is transferred;

a carrier collection device including a rotatable collection roller, a magnet, and a conductor member, the carrier collection device being configured to collect the carrier from the image carrying member, the collection roller being disposed facing the image carrying member, downstream of a development portion where the electrostatic latent image formed on the image carrying member is developed, and upstream of a transfer portion where the toner image carried by the image carrying member is transferred to the transfer member in a rotation direction of the image carrying member, the magnet being non-rotatably disposed inside the collection roller, the conductor member being disposed opposed to the collection roller with a space therebetween and outside of the image carrying member;

a first bias application unit configured to apply a first bias obtained by superimposing a first direct-current voltage and an alternating-current voltage, to the collection roller; and a second bias application unit configured to apply a second bias including a second direct-current voltage, to the conductor member, wherein, during the image forming operation, an alternating-current electric field is formed between the collection roller to which the first bias is applied and the conductor member to which the second bias is applied.

2. The image forming apparatus according to claim 1, wherein, during the image forming operation, a direct-current potential of the collection roller is equal to a direct-current potential of the conductor member.

3. The image forming apparatus according to claim 1, wherein, during the image forming operation, a polarity of a direct-current potential of the collection roller is the same as a charged polarity of the toner, and a polarity of a direct-current potential of the conductor member is opposite to the charged polarity of the toner.

4. The image forming apparatus according to claim 1, wherein, during the image forming operation, a polarity of a direct-current potential of the collection roller and a polarity of a direct-current potential of the conductor member are the same as a charged polarity of the toner, and an absolute value of the direct-current potential of the conductor member is lower than an absolute value of the direct-current potential of the collection roller.

5. The image forming apparatus according to claim 1, wherein, during the image forming operation, a polarity of a direct-current potential of the collection roller and a polarity of a direct-current potential of the conductor member are the same as a charged polarity of the toner, and an absolute value of the direct-current potential of the conductor member is higher than an absolute value of the direct-current potential of the collection roller.

6. The image forming apparatus according to claim 1, wherein the first bias application unit and the second bias application unit are the same power supply.

7. The image forming apparatus according to claim 1, wherein the first bias application unit and the second bias application unit are different power supplies from each other.

8. The image forming apparatus according to claim 1, wherein the second direct-current voltage is not superimposed with an alternating-current voltage.

9. The image forming apparatus according to claim 1, wherein, during the image forming operation, a polarity of a direct-current potential of the image carrying member and a polarity of a direct-current potential of the collection roller are the same as a charged polarity of the toner, and an absolute value of the direct-current potential of the collection roller is higher than an absolute value of the direct-current potential of the image carrying member.

10. The image forming apparatus according to claim 1, wherein the conductor member is disposed above a rotation axis of the collection roller in a vertical direction.

11. The image forming apparatus according to claim 1, wherein the conductor member is a sheet member in which a metal layer is provided on a surface of a resin layer.

12. An image forming apparatus configured to perform an image forming operation, the image forming apparatus comprising:

a rotatable image carrying member on which an electrostatic latent image is formed;

a developing device including a developer carrying member, the developing device being configured to contain a developer including toner and carrier, the developer carrying member being configured to carry the developer for developing the electrostatic latent image formed on the image carrying member into a toner image;

a transfer member to which the toner image carried by the image carrying member is transferred;

a carrier collection device including a rotatable collection roller, a magnet, and a conductor member, the carrier collection device being configured to collect the carrier from the image carrying member, the collection roller being disposed facing the image carrying member, downstream of a development portion where the electrostatic latent image formed on the image carrying member is developed, and upstream of a transfer portion where the toner image carried by the image carrying member is transferred to the transfer member in a rotation direction of the image carrying member, the magnet being non-rotatably disposed inside the collection roller, the conductor member being disposed facing the collection roller; and a bias application unit configured to apply a bias obtained by superimposing a direct-current voltage and an alternating-current voltage, to the collection roller, wherein the conductor member is grounded, and wherein, during the image forming operation, an alternating-current electric field is formed between the collection roller to which the bias is applied and the conductor member.

13. The image forming apparatus according to claim 12, wherein, during the image forming operation, a polarity of a direct-current potential of the image carrying member and a polarity of a direct-current potential of the collection roller are the same as a charged polarity of the toner, and an absolute value of the direct-current potential of the collection roller is higher than an absolute value of the direct-current potential of the image carrying member.

14. The image forming apparatus according to claim 12, wherein the conductor member is disposed above a rotation axis of the collection roller in a vertical direction.

15. The image forming apparatus according to claim 12, wherein the conductor member is a sheet member in which a metal layer is provided on a surface of a resin layer.

16. The image forming apparatus according to claim 1, wherein a distance between the conductor member and the collection roller is within a range of 0.2 mm to 3.0 mm at the closest position.

17. The image forming apparatus according to claim 1, wherein the second direct-current voltage is the same as the first direct-current voltage.

18. The image forming apparatus according to claim 1, wherein the second direct-current voltage is different from the first direct-current voltage.

* * * * *